April 29, 1930.    F. ROBINSON    1,756,494
SHUTTLE SPINDLE PIVOT
Filed Feb. 9, 1929
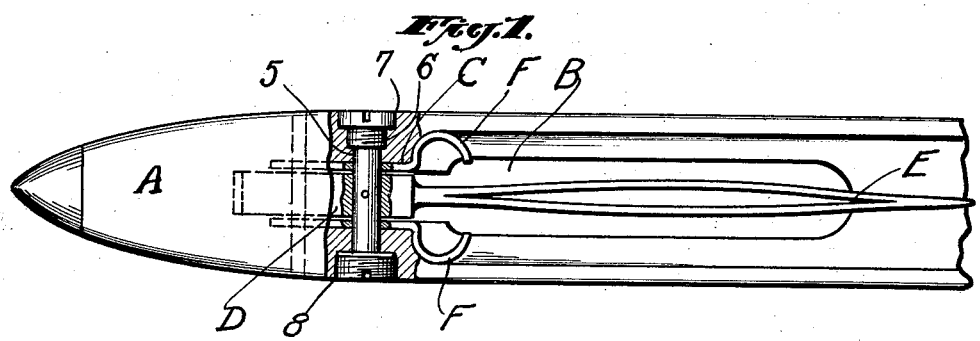
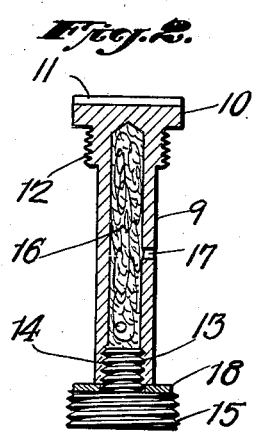
Inventor
F RANKLIN ROBINSON.
By Clarence A. O'Brien
Attorney Patented Apr. 29, 1930

1,756,494

UNITED STATES PATENT OFFICE

FRANKLIN ROBINSON, OF PATERSON, NEW JERSEY

SHUTTLE-SPINDLE PIVOT

Application filed February 9, 1929. Serial No. 338,766.

This invention relates generally to shuttles for looms and has particular reference to a shuttle spindle pivot and aims to provide a pivot that can be rigidly associated with the shuttle body so as not to work out of place, and consequently injure the loom reed or do other damage. Furthermore, the construction is such as to enable the pin to be removed from the body in the event it or the butt of the spindle becomes unduly worn. In addition to this, means is provided to enable the pin to continuously emit a sufficient amount of lubricant to the spindle butt, so that the same may be freely swung into or out of the shuttle spindle cavity, and this without requiring any unusual effort on the part of the operator.

A final and important object of this invention is the provision of a shuttle spindle pivot that is of simple and inexpensive construction, and that will not require such changes in the shuttle body or spindle structure as to impair the efficient operation of the shuttle.

In the drawing wherein like reference characters indicate corresponding parts in both of the views:

Figure 1 is a fragmentary view of a loom shuttle partially in longitudinal section and being equipped with my improved spindle pivot, and Figure 2 is a detailed longitudinal section of the pivot, per se.

Now having particular reference to the drawing, A designates a generally conventional shuttle body having the usual cavity B for the quill or cop tube, one end of this cavity being formed with the usual longitudinal extension C for the reception of the butt end D of the spindle E for receiving the quill or cop tube. This shuttle is also equipped with the other usual structural elements generally illustrated, and inasmuch as they are well known, a description thereof is not believed here necessary. In carrying out my invention, the said shuttle body A at the usual point between the ends of the cavity extension C is formed with a transverse bore 5 that registers with the usual opening in the spindle butt, as well as the usual openings of the usual metal clips F, which flank the sides of the butt end of the spindle as disclosed.

Adjacent one outer end of this bore 5, the same is of enlarged area and threaded as at 6, while at this extreme end, the bore is formed with a further enlarged counter-sink 7. The extreme opposite end of this bore 5 is formed to provide a relatively wide threaded counter-sink 8, the diameter of which is similar to the diameter of the counter-sink 7 at the opposite end of the bore. My pivot consists of a hollow pin 9 having an unthreaded rounded head 10 at one end, which is formed with a screw driver slot 11, this pin 9 immediately inwardly of said head being of enlarged diameter and screw threaded as at 12. Obviously, the pin 9 is adapted to be engaged within the bore through the end thereof having the unthreaded countersink 7, and as soon as the enlarged threaded area 12 of the pivot reaches the enlarged threaded portion 6 of the bore, the said pivot is screwed inwardly until the outer surface of the head 10 is flush with or slightly inwardly of the adjacent side surface of the shuttle body.

The opposite end of the pivot 9 is open and formed with internal screw threads 13, and after the pivot has been arranged within the bore, a threaded plug 14 is screwed into the open end of the pivot bore as illustrated in Figure 2. This plug 14 is formed with a threaded head 15 of the same diameter as the unthreaded head 10 for threaded engagement within the threaded counter-sink 8 of the adjacent end of the bore 5 and obviously, the provision of the two threaded joints at this end of the pivot as well as the threaded joint between the opposite end of the pivot and the shuttle body will substantially overcome any liability of the pivot becoming loose within the shuttle bore.

There is preferably arranged within the bore of the pivot 9 a suitable wick or lubricant carrying substance 16, which is completely soaked with a lubricant before the plug 14 is screwed into the end of the pivot. At a point intermediate its ends, the pivot 9 is formed with a small lubricant emitting opening 17 that communicates with the lubricant chamber to permit the lubricant to flow through the pivot, thus maintaining the joint between the spindle and pivot in lubricated condition to enable the free swinging of the spindle without unusual effort. If desired, a suitable washer 18 may be provided between the end of the pivot 9 and the plug head 15, as illustrated in Figure 2.

In view of the foregoing description when considered in conjunction with the accompanying drawing, it will be apparent that I have provided a novel, simple and useful pivot for the quill or cop tube spindles of loom shuttles, and even though I have herein shown and described the invention as consisting of certain detailed structural elements, it is nevertheless to be understood that some changes may be made therein without affecting the spirit and scope of the appended claims.

Having thus described my invention, what I claim as new, and desire to secure by Letters-Patent, is:

1. In combination, a shuttle body having a cavity for the quill or cop tube formed with an extension, the part of the body containing said extension having a bore penetrating said body and traversing said extension transversely thereof, and formed at its opposite ends with counter-sinks, the counter-sink at one end being threaded and the counter-sink at the opposite end being unthreaded, said bore directly inwardly of the unthreaded counter-sink being of a diameter substantially intermediate that of the diameter of the bore and said counter-sink, and being screw threaded; a pivoted spindle having its butt in the extension, a pivot adapted to be disposed within said bore and through the usual opening of the spindle butt, said pivot having an unthreaded head upon one end for engagement within the unthreaded counter-sink of the bore, an enlargement formed directly inwardly of said head and being threaded for threaded engagement within the threaded enlarged portion of said bore, the opposite end of said pivot being provided with a threaded socket and a threaded plug adapted to be screwed into the socket after the pivot has been arranged within the bore, said pin being formed at its outer end with a threaded head for threaded engagement within the threaded counter-sink of the bore.

2. In a shuttle spindle pivot, a pivot pin, an unthreaded head upon one end of said pin, said pin directly inwardly of the head being provided with a threaded enlargement, the opposite end of said pin being formed with a threaded socket, a threaded plug adapted for threaded engagement within the socket, and a threaded head upon the outer end of said plug.

3. In a shuttle spindle pivot, a pivot pin, an unthreaded head upon one end of said pin, said pin directly inwardly of the head being provided with a threaded enlargement, the opposite end of said pin being formed with a threaded socket, a threaded plug adapted for threaded engagement within the socket, a threaded head upon the outer end of said plug, said threaded head of the plug being of the same diameter as the unthreaded head at the opposite end of the pin, said pin being hollow for the reception of a lubricant prior to the insertion of the plug therein and said pin having a lubricant emitting opening between its ends and registering with the lubricant chamber of the pin.

In testimony whereof I affix my signature.

FRANKLIN ROBINSON.